C. B. BROWN.
Mower.
No. 952.
Reissued May 1, 1860.
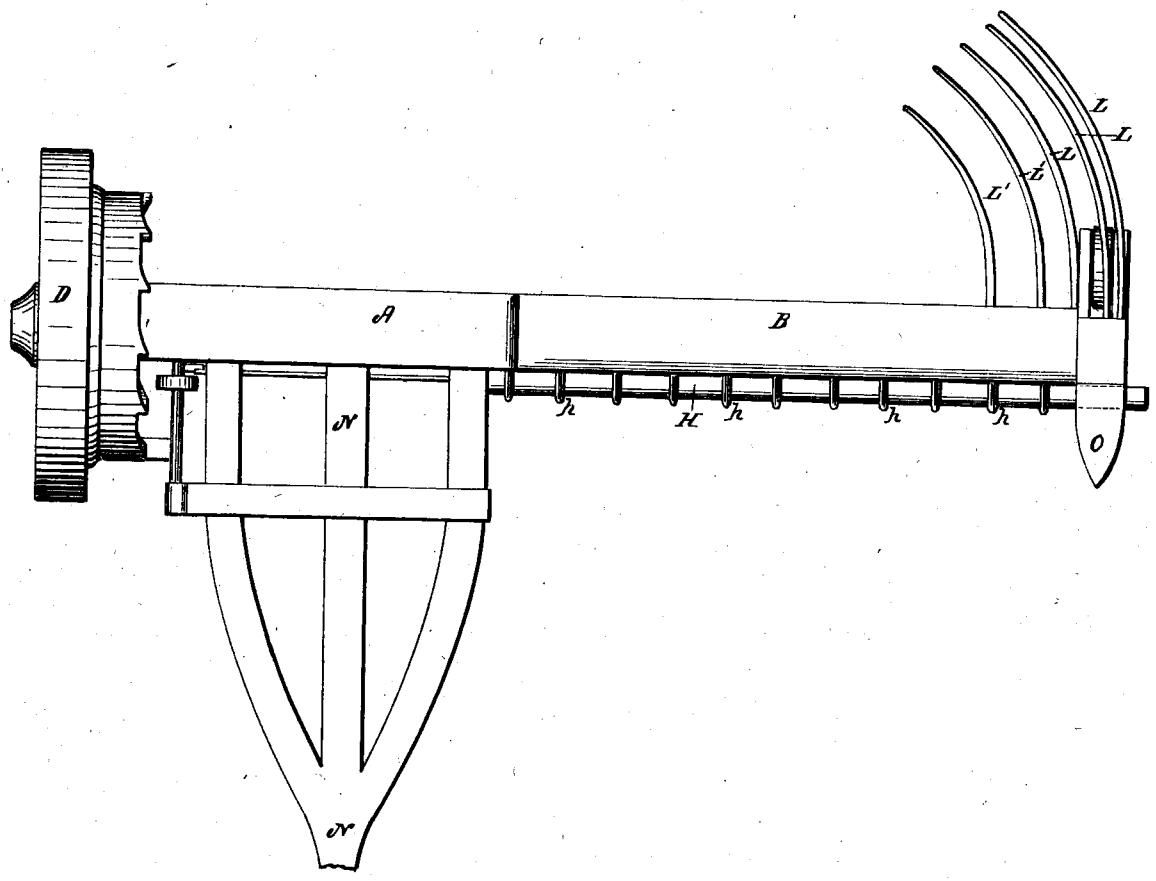
N. PETERS, Photo-Lithographer, Washington, D. C.

UNITED STATES PATENT OFFICE.

C. AULTMAN & CO., OF CANTON, OHIO, ASSIGNEES OF C. B. BROWN, OF GRIGGSVILLE, ILLINOIS.

IMPROVEMENT IN GRAIN AND GRASS HARVESTERS.

Specification forming part of Letters Patent No. 9,446, dated December 7, 1852; Reissue No. 952, dated May 1, 1860.

DIVISION B.

*To all whom it may concern:*

Be it known that COLLINS B. BROWN, formerly of Griggsville, in the county of Pike and State of Illinois, now of Alton, in the county of Madison, in the same State, invented certain new and useful Improvements in Reaping and Mowing Machines, the especial object of the improvement which is the subject of this patent being to facilitate the cutting of grass.

In the operation of cutting grass with mowing-machines it has been deemed advisable to deposit the cut grass on the ground immediately behind where it stood previous to the cutting except at that side of the swath next the standing grass, where it has been found necessary to turn the cut grass toward the middle of the swath, so as to leave a strip of stubble next the standing grass unencumbered by the cut grass, that upon the return of the machine to cut the next swath those portions of the cutting apparatus and of the frame which run upon or near the ground just outside of the line of the standing grass may have a clean stubble beneath them, and thus avoid entanglement with and obstruction from the cut grass which would be inevitable if a strip was not cleared by turning the cut grass aside. The strip thus cleared is commonly called a "clear track." The instrument by which the clearing is effected is called a "track-clearer," and the operation is called "track-clearing." The track-clearer has usually been made of wood or of sheet-iron and wood combined, but most commonly of a solid board from two to five feet in length, placed on edge and attached by its front end to the rear of the divider and of the outer end of the finger-beam, and inclining from its forward end backward toward the middle of the swath at an angle with the finger-beam of, say, from fifty degrees to seventy-five degrees. The lower edge of the board, resting on the ground and moving forward with the machine obliquely to its line of motion, acts like a wedge to scrape, crowd, or slide gradually toward the middle of the swath the cut grass and other loose matter lying upon the stubble in its path. Sometimes the scraping-board is placed in a position inclined to the plane of the finger-beam as well as to the line of the length of the finger-beam, inclining from its outer and upper edge downward and inward toward the middle of the swath at an angle of from thirty to sixty degrees. The object of this transverse inclination is to cause the cut grass, as it falls backward, to slide down the inclined surface of the board by its weight, to deflect it laterally during its descent, and thereby render less scraping of the grass over the stubble necessary. Sometimes the scraping-board has been made narrow and low at its front end and gradually widening, and its upper edge rising as it extends backward with a view to enable it to pass under and raise, while crowding inward, that portion of the cut grass which is entangled with the standing grass, and thereby render its disengagement from the standing grass more certain. Sometimes the front portion of the board has had its lower edge connected to the rear edge of the finger-beam by a piece of sheet-iron attached to both and fitted to the angle between them, forming a kind of sole or bottom for the track-clearer. Such a sole has also been made of wood. Sometimes the scraping-board, instead of being rigidly attached to the divider or finger-beam, has been hinged thereto by means of a horizontal hinge or pivot, the sheet-iron sole itself in some cases performing, by its flexibility, the duty of such a hinge. All these track-clearers, whether rigidly connected to the frame of the machine or hinged thereto, have had many defects, among which I will mention the great weight of the board when it is made large enough to perform its duty effectively and thick enough to have the requisite strength for durability, which causes it to bear heavily on the ground, thereby increasing very much both the direct and the side draft of the machine. Moreover, the board having a continuous surface, every loose stone, stick, clod, or like matter which it meets it has to bear and rub against along its entire length behind the point of contact to thrust it aside through the stubble, thus causing friction and an increase of draft. Further, if a stone or other obstacle firmly set in the ground should be met with the whole board, with its load, would have to be raised on its hinge (in case the board should be hinged) to pass over this obstacle; but in case the board should be rigidly connected to the frame, then the divider and the outer end of the finger-beam, as well as the board itself, would have to be raised at the expense of a great increase of friction and draft, besides subjecting the machine to great and dangerous strains; but if the obstacle should present a projection that would catch upon the board, so as to prevent it from rising, then the track-clearer, with the whole machine, would have to be turned aside from the proper line of the swath to pass such an obstruction without being broken, unless by reason of the rigidity and strength of the obstacle and of the track-clearer and other parts of the machine they should be capable of arresting the momentum of the horses and machine and suddenly stopping them.

To avoid the before-mentioned and other defects of previous track-clearers, and to secure important new advantages, the said BROWN invented the method of making track-clearers of skeleton frame-work instead of a continuous solid surface of boards or metal, thus combining strength with lightness, and permitting loose stones, sticks, chips, and like matters to pass through the spaces in the frame, and thereby avoiding the friction and increase of draft that would result from the track-clearer being required to force such obstacles across its path through the stubble. Further, to diminish the liability of the track-clearer to clog, the said BROWN invented the method of making the skeleton frame of a series of fingers projecting backward from the outer end of the finger-beam in the proper relative position to form a track-clearer; and the said BROWN invented, further, the method of making the fingers of track-clearers to yield in every direction to enable them to pass many obstructions more readily, to facilitate the separation of the cut grass from the uncut, and the turning of the cut grass aside from the track to be cleared.

The accompanying drawing is a plan of a mowing-machine, showing one application of said BROWN'S method of constructing track-clearers; but it is not deemed necessary that more of the machine should be herein described than is required to explain the invention herein claimed, as the other parts of the machine are fully described in another division of the original patent of which this is a reissue and one division.

In this drawing, A B is the main beam and principal portion of the frame of the machine. N is the tongue by which the machine is drawn and guided. D is the driving-wheel, which, through proper mechanism, gives motion to the cutter H, which is arranged to play through a series of slotted guard-fingers, *h*, on the front edge of the finger-beam B, which forms part of the main beam, and at its outer end carries a divider, O, of the usual pyramidal or wedge-like form, projecting apex foremost, as represented.

The track-clearer is placed in rear of the divider, and consists of skeleton frame-work composed of bars or fingers L′ L′ L L L, so arranged as to form a general outline resembling that of a track-clearer of the usual form with a sole. The skeleton sole, which in this case is formed by the bars L′ L′, may be made wider when thus formed of open-work than would be admissible if it had a continuous surface for the grass to rest on, as the stubble protruding up between the bars tends, like a brush, to dislodge the grass from the sole, and causes it to pass off at the rear end of the bars, thus effectually preventing its lodgment thereon. The forward ends of the bars are connected in this case through the medium of the rear end of the divider and of the rear portion of the outer end of the finger-beam, to which they are firmly attached by means of any common and suitable mode of fastening that admits of their being taken off to facilitate the conversion of the machine from a mower to a reaper, and vice versa. The bars or fingers L should be made to taper, as shown in the drawings, from their front to their free extremities, if it be desired to make them, as is in some cases important, to yield easily and be at the same time light and strong. The tapering, however, is not deemed essential, but is merely given as the best form. They should likewise be made of elastic material, such as unannealed iron wire or tempered steel; but wood would answer the purpose if but little elasticity in the bars of the skeleton be required.

The yielding of a finger often allows the track-clearer to pass an obstruction without changing its position or disturbing the progress of the machine in cases where both these difficulties would result from the track-clearer being made solid or with a continuous surface. Hence for mowing on rough ground the capacity of each finger to yield independently of the other is of great importance.

What is claimed under this patent as the invention of the said COLLINS B. BROWN is—

1. The combination of a skeleton track-clearer with the cutting apparatus of a mowing-machine, substantially as described.

2. The construction of skeleton track-clearers of a series of fingers, substantially as described.

3. A yielding finger or the equivalent thereof in track-clearers, substantially as described.

In testimony whereof we have hereunto subscribed our names.

CORNELIUS AULTMAN,
LEWIS MILLER,
T. R. TONNER,
JACOB MILLER,
GEORGE COOK,
*Composing the firm of C. Aultman & Co.*

Witnesses:
ISAAC HAZLETT,
JAS. TONNER.